(12) United States Patent
Langeveld

(10) Patent No.: US 10,509,604 B2
(45) Date of Patent: Dec. 17, 2019

(54) MULTI-PRINTER SYSTEM WITH A SCHEDULER AND A METHOD THEREOF

(71) Applicant: OCE-TECHNOLOGIES B.V., Venlo (NL)

(72) Inventor: Susanna C. Langeveld, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 28 days.

(21) Appl. No.: 15/346,402

(22) Filed: Nov. 8, 2016

(65) Prior Publication Data

US 2017/0052744 A1   Feb. 23, 2017

Related U.S. Application Data

(63) Continuation of application No. PCT/EP2015/059527, filed on Apr. 30, 2015.

(30) Foreign Application Priority Data

May 9, 2014   (EP) ..................................... 14167666

(51) Int. Cl.
*G06F 3/12*   (2006.01)

(52) U.S. Cl.
CPC .......... *G06F 3/1207* (2013.01); *G06F 3/1203* (2013.01); *G06F 3/1204* (2013.01);
(Continued)

(58) Field of Classification Search
None
See application file for complete search history.

(56) References Cited

U.S. PATENT DOCUMENTS

| | | | |
|---|---|---|---|
| 7,349,638 B2 * | 3/2008 | Mima | B41J 2/17546 399/10 |
| 8,824,003 B2 * | 9/2014 | Gaertner | G06F 3/1203 358/1.15 |

(Continued)

FOREIGN PATENT DOCUMENTS

EP   2 431 861 A2   3/2012

*Primary Examiner* — Mohammad H Ghayour
*Assistant Examiner* — Pawan Dhingra
(74) *Attorney, Agent, or Firm* — Birch, Stewart, Kolasch & Birch, LLP

(57) ABSTRACT

The invention relates to a print system comprising a plurality of printers for printing print jobs, a user interface screen connected to the print system, each printer of the plurality of printers comprising a print job scheduling module for planning a print job schedule for print jobs submitted to the printer and an operational action scheduling module for planning an operational action schedule of operational actions to be applied to the printer, a control unit comprising a first merging module for merging for each printer the print job schedule and the operational action schedule into a first merged schedule, the control unit configured to control for each printer display of the first merged schedule on the user interface screen, wherein the control unit comprises a second merging module for merging the operational action schedules of the plurality of printers chronologically into a second merged schedule, and the control unit is configured to control display of the second merged schedule along the first merged schedule on the user interface screen. The invention further relates to a method to be applied in the print system.

19 Claims, 4 Drawing Sheets

(52) U.S. Cl.
CPC ............ *G06F 3/126* (2013.01); *G06F 3/1229* (2013.01); *G06F 3/1259* (2013.01); *G06F 3/1285* (2013.01); *G06F 3/1286* (2013.01)

(56) References Cited

U.S. PATENT DOCUMENTS

| | | | | |
|---|---|---|---|---|
| 9,036,191 | B2* | 5/2015 | Kikumoto | G06K 15/005 358/1.15 |
| 9,858,020 | B2* | 1/2018 | Westerhoff | G06F 3/1203 |
| 2002/0057455 | A1* | 5/2002 | Gotoh | G06F 3/1207 358/1.15 |
| 2005/0243365 | A1* | 11/2005 | Noda | G06F 3/1262 358/1.15 |
| 2006/0044585 | A1* | 3/2006 | Kaneko | G06F 3/1205 358/1.13 |
| 2006/0044594 | A1* | 3/2006 | Shirai | G06F 3/1207 358/1.14 |
| 2006/0044612 | A1* | 3/2006 | Kayama | G06F 3/1204 358/1.15 |
| 2006/0227373 | A1* | 10/2006 | Matoba | G06F 3/1204 358/1.15 |
| 2007/0146772 | A1* | 6/2007 | Castellani | G06F 3/1208 358/1.15 |
| 2011/0055768 | A1* | 3/2011 | Chen | G06F 3/0482 715/841 |
| 2011/0224816 | A1* | 9/2011 | Pereira | G05B 19/41865 700/100 |
| 2012/0062919 | A1* | 3/2012 | Hashimoto | G06F 3/1207 358/1.12 |
| 2013/0271785 | A1* | 10/2013 | Sakata | G06K 15/4065 358/1.15 |
| 2014/0107953 | A1* | 4/2014 | Mueller | B65G 11/023 702/54 |

* cited by examiner

MULTI-PRINTER SYSTEM WITH A SCHEDULER AND A METHOD THEREOF

CROSS REFERENCE TO RELATED APPLICATIONS

This application is a Continuation of PCT International Application No. PCT/EP2015/059527, filed on Apr. 30, 2015, which claims priority under 35 U.S.C. 119(a) to Patent Application No, 14167666.8, filed in Europe on May 9, 2014, all of which are hereby expressly incorporated by reference into the present application.

FIELD OF THE INVENTION

The invention relates to a print system comprising a plurality of printers for printing print jobs, a user interface screen connected to the print system, each printer of the plurality of printers comprising a print job scheduling module for planning a print job schedule for print jobs submitted to the printer and an operational action scheduling module for planning an operational action schedule of operational actions to be applied to the printer, a control unit comprising a first merging module for merging for each printer the print job schedule and the operational action schedule into a first merged schedule, the control unit configured to control for each printer display of the first merged schedule on the user interface screen. The first merging module produces a first merged schedule at regular time periods or triggered by changes in the print job queue or operational actions occurring with respect to the printer. The operational action schedule module gets input from the print job schedule and sensors in the printer in order to establish the operational action schedule.

An operational action may be defined as an action for which operator intervention is needed towards the printer, however an unattended operational action like printing a calibration sheet may also be envisioned. The operational actions in the operational action schedule usually lead to an alert message for the operator to intervene.

BACKGROUND OF THE INVENTION

In a print system for only one printer a job is programmed in a job program mode, a job ticket being displayed on a monitor screen. After the job has been programmed, it is moved from a memory to a print queue of the one printer. The sequence of jobs in this queue is determined by priority allocated to each of the jobs and the time of arrival of the job in the queue. The print queue itself, at least the names of the jobs and the associated number, and a number of variables, such as the number of documents required and the type of receiving material required, are displayed on the user interface screen if the operator of the print system so requests.

The print system at all times knows for the only one printer what type of receiving material is situated in each of the holders and also the different types of receiving material required for finishing a job in the print queue of the printer. In this way the system can always check whether the correct receiving material has been loaded to enable printing to start. If the correct receiving material is loaded in the holders, the job will be printed. If not, then the system will indicate to the operator what type of receiving material he should insert in one or more of the holders. Nowadays the queue of planned print jobs is for example merged with the planning for the operational actions into one time line. An indication item may be displayed at the print queue of the only one printer. The indication item indicates that an operator intervention is required in the period for the planned and displayed print jobs, for example in case of insufficient receiving material or insufficient marking material like ink or toner.

In a print system for a plurality of printers, for each printer a print queue may be displayed on one window on the user interface screen. For each printer the print queue may also be merged with the planning of the operational actions on the printer. A disadvantage of such an overview of print queues of a plurality of printer in one window is that the displayed indication items for operational actions among the displayed print queues become less easy-viewed.

The operator may overlook an operational action. Such an overlooking may result in a halt of a printer, for example due to a shortage of receiving material.

It is an objective of the invention to provide a print system that supports the operator to keep a print system of a plurality of printers running.

SUMMARY OF THE INVENTION

For this purpose, the print system for the plurality of printers has been invented wherein the control unit comprises a second merging module for merging the operational action schedules of the plurality of printers chronologically into a second merged schedule, and the control unit is configured to control display of the second merged schedule along the first merged schedule on the user interface screen.

In the print system according to the invention, the second merging module is configured to merge the operational action schedules of all printers of the plurality. An operator who has to keep the print system of all printers running, notices in one glance the moments in time from now for which an operational action is required. The operator reaches a high productivity of the printers since he can keep all the printers running. Since the moments in time of the operational actions for each printer are planned, the second merging module is able to merge these planned moments in time into one time line order in a second merging schedule.

The second merging schedule is displayed in one time line with indication items at the planned moments in time.

According to an embodiment the control unit is configured to control display on the user interface screen of the first merged schedule and the second merged schedule along a same time axis. In this way an indication item of an operational action for a specific printer on the second merged schedule may be placed on the same level in an x-direction or a y-direction of the user interface screen as a corresponding indication item in the first merged schedule in the print queue of the specific printer. The operator sees at one glance the first moment in time for which a printer of the plurality of printers requires an operational action.

According to an embodiment the second merging module is configured to merge from the operational action schedules only operational actions which require operator intervention. This is advantageous if the number of operational actions which require no operator intervention is large and makes the displayed second merged schedule less easy-viewed. In particular, the operator is more interested in operational actions which require his active involvement. Operational actions which require an operator intervention may be loading of consumables, like toner, ink or any other marking material, loading of receiving material such as paper or plastic sheets, loading of finishing material, like staples, unloading of a fully loaded output holder of a printer, and emptying a waste container for staples, perforation waste, ink and toner.

According to an embodiment wherein the control unit is configured to display additional information near or at an operational action on the displayed second merged schedule upon selection of the operational action. The operator gets extra information like instructions and/or advices for his actions to be performed.

According to an embodiment the control unit is configured upon selection of a printer from the first merged schedule displayed on the user interface screen to replace the displayed first merged schedule by information regarding the selected printer. The displayed second merge schedule remains visible when a printer is selected from the displayed first merged schedule.

The invention also relates to a method of using a print system comprising a plurality of printers for printing print jobs and a user interface screen, the method comprising the steps of planning for each printer of the plurality of printers a print job schedule for print jobs submitted to the printer, planning for each printer of the plurality of printers an operational action schedule of operational actions to be applied to the printer, merging for each printer the print job schedule and the operational action schedule into a first merged schedule, and displaying for each printer the first merged schedule on the user interface screen, wherein the method comprises the steps of merging the operational action schedules of the plurality of printers chronologically into a second merged schedule, and displaying the second merged schedule along the first merged schedule on the user interface screen.

According to an embodiment of the method according to the invention the method comprises the step of displaying the first merged schedule and the second merged schedule along a same time axis on the user interface screen.

According to an embodiment of the method according to the invention the method comprises the step of merging from the operational action schedules only operational actions which require operator intervention into the second merged schedule.

According to an embodiment the method comprises the step of upon selection of an operational action on the displayed second merged schedule on the user interface screen displaying additional information about the operational action near or at the selected operational action.

According to an embodiment the method comprises the step of upon selection of a printer from the first merged schedule displayed on the user interface screen replacing the displayed first merged schedule by information regarding the selected printer. The invention also relates to a recording medium comprising computer executable program code configured to instruct at least one computer to perform the method according to the invention.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The invention will now be explained further with reference to the drawings indicated below.

DETAILED DESCRIPTION OF THE EMBODIMENTS

Figure 1:
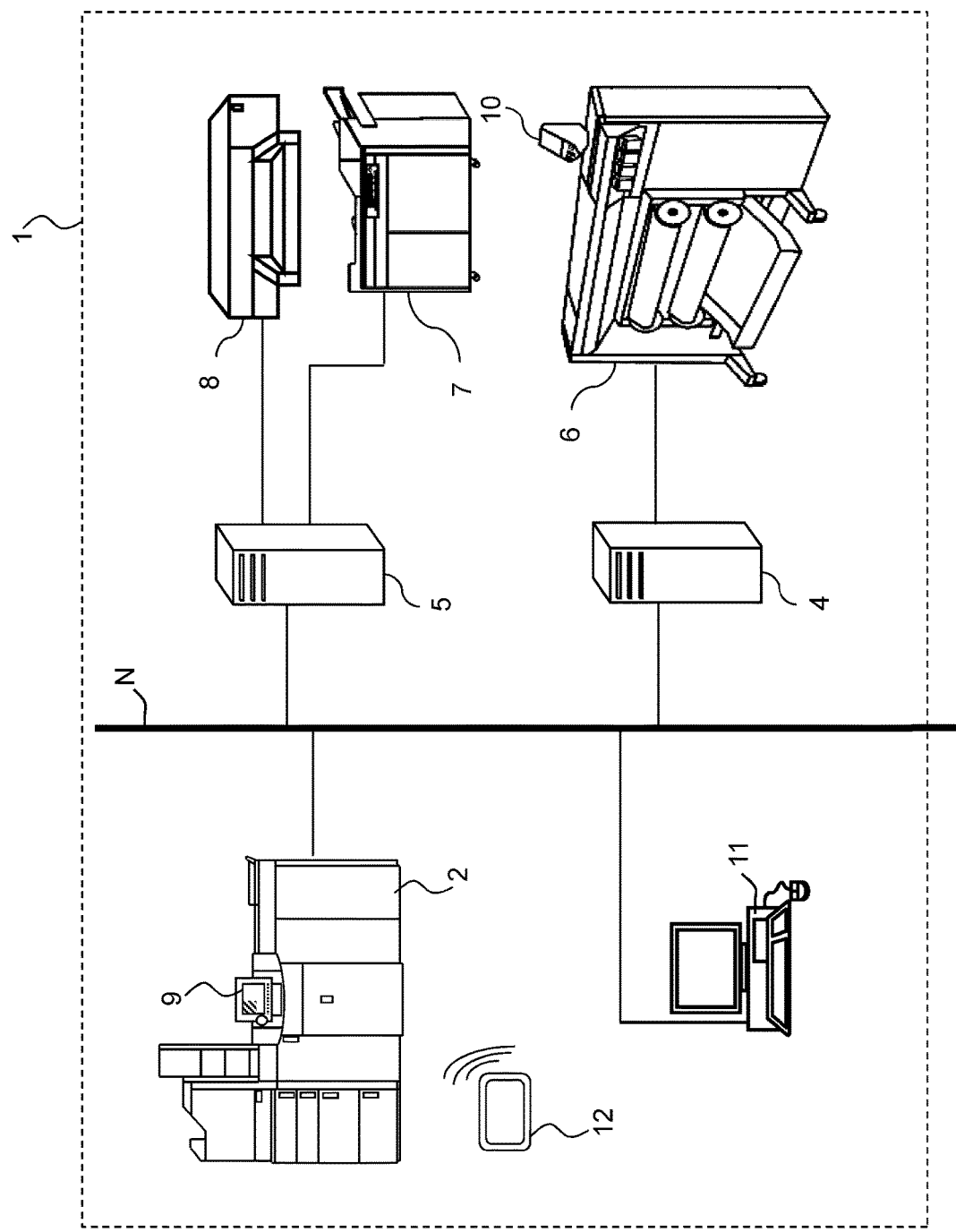
FIG. 1 shows the general arrangement of the print system comprising the plurality of printers according to the invention.

The present invention will now be described with reference to the accompanying drawings, wherein the same or similar elements are identified with the same reference numerals throughout the several views.

FIG. 1 shows a general arrangement of a print system 1 according to the invention. This system 1 comprises a plurality of printers 2, 6, 7, 8 connected to a network N. The network N may be wired or at least partly wireless. The printers 7, 8 are connected to the network N via a server 5. The server 5 may act as a control unit for the printers 7, 8. The printer 6 is connected to the network N via a server 4. The server 4 may act as a control unit for the printer 6. A work station 11 may also be connected to the network N. The work station 11 may act as a control unit for any of the printers 2, 6, 7, 8 of the print system 1.

According to a first embodiment of the print system 1 a control unit corresponding to a printer comprises the print job scheduling module and the operational action scheduling module according to the invention (not shown). The print job scheduling module is configured to plan for each printer of the plurality of printers a print job schedule for print jobs submitted to the printer. The operational action scheduling module is configured to plan for each printer of the plurality of printers an operational action schedule of operational actions to be applied to the printer. A control unit of one of the printers 2, 6, 7, 8 acts as a central and data gathering control unit comprising the first merging module and the second merging module according to the invention.

According to a second embodiment of the print system 1 the control unit comprising the first merging module and the second merging module according to the invention, is separate from the printer 2, 6, 7, 8 but connected to the network N, like the work station 11 or any other computer device, like a tablet device. In another embodiment of the print system 1 according to the invention only the second merging module is comprised in such a separate control unit, while the first merging module is located in the printers itself.

The control unit as in the first and second embodiment mentioned here-above will be hereinafter be referenced to as a data gathering control unit.

Print jobs submitted to any one of the printers 2, 6, 7, 8 may be gathered via the network N by the data gathering control unit of the print system 1. The data gathering control unit may be one of the control units of the printers 2, 6, 7, 8 or a separate control unit like work station 11. The data gathering control unit may receive a print job from a printer in the print system 1 to which the print job has been submitted. The data gathering control unit also receives the planned operational actions from each printer in the print system 1. For each printer the gathered print jobs and operational actions are planned in the first merged schedule by means of a first scheduling module residing in the data gathering control unit. By means of a second scheduling module residing in the data gathering control unit the operational actions of all printers 2, 6, 7, 8, are merged into the second merged schedule according to the invention.

The data gathering control unit is also configured to control display of the first and second merged schedule on a user interface screen in the print system 1.

A mobile device 12 is wireless connected to the network N. The screen of the mobile device 12 may act as a user interface screen of the print system 1. Printer 2 is provided with local user interface screen LUI 9. The printer 6 is provided with a local user interface screen LUI 10. The local user interface screens LUI 9, 10 may act as a user interface screen for the print system 1 according to the invention.

According to an embodiment the data gathering control unit is at least part of a computer device comprising a user interface screen on which the first merged schedule and the second merged schedule are displayable according to the invention. An application configured to display the first merged schedule and the second merged schedule may be a web based application.

Figure 2:
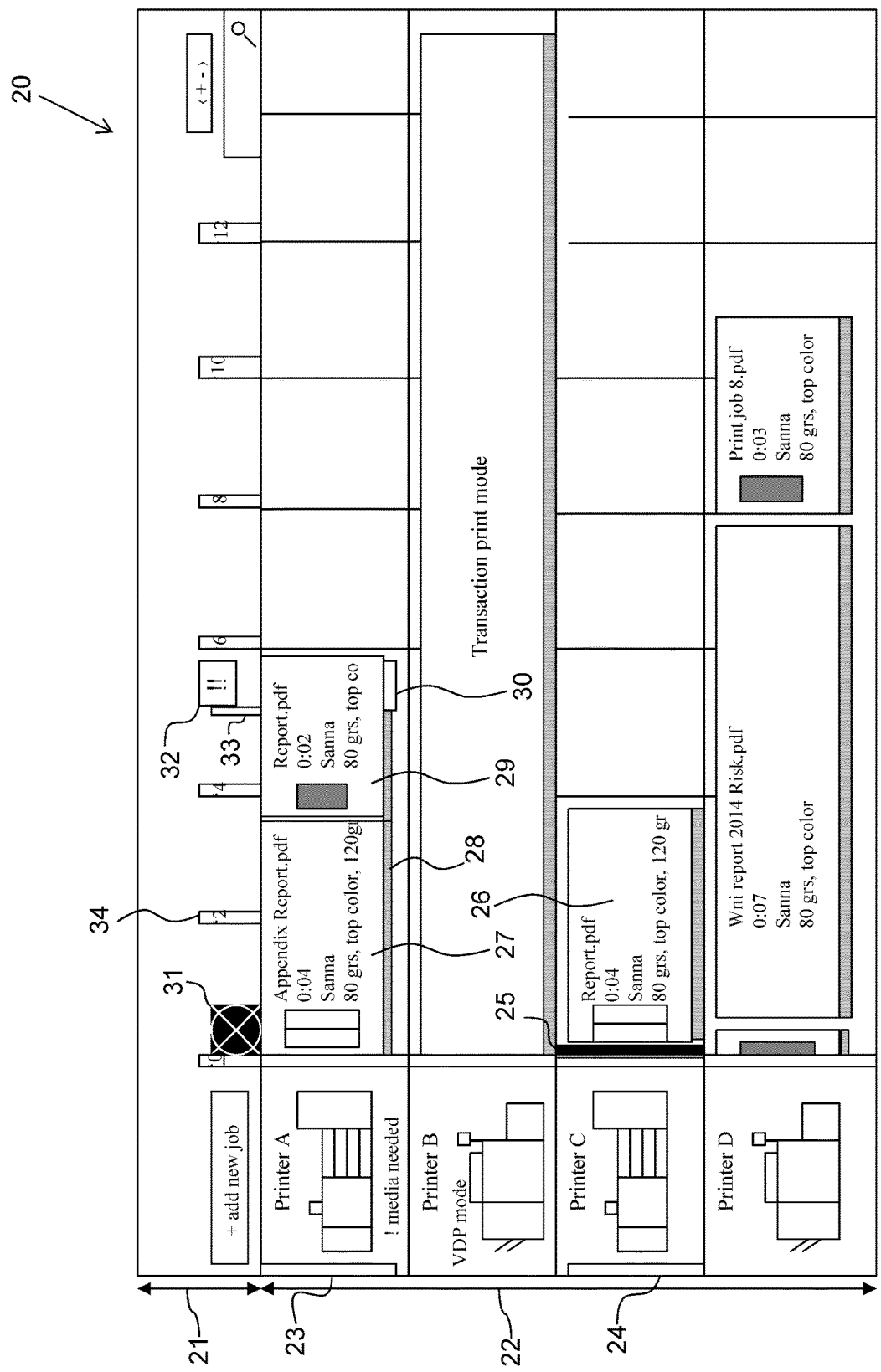
FIG. 2 shows a user interface screen of the print system according to the invention.

FIG. 2 shows a window 20 of the user interface screen according to the invention. The window 20 shows the printers of a print system according to the invention. The print system comprises the printers A, B, C, D as shown by printer images on the left side in a lower part 22 of the window 20. On the right side of each printer A, B, C, D a corresponding print job queue is shown in a time frame of approximately 16 minutes from now. The time frame is indicated in an upper part 21 of the window 20 by means of time ticks 34. Vertical lines are extending from the time ticks 34 through all print job queues beneath the upper part 21 into the lower part 22.

Print jobs are indicated by white rectangles 26, 27, 29. The white rectangles comprise a thumbnail image of the print job and metadata of the print job such as file name, job duration, job submitter and media properties. Printer B does not have print jobs indicated by white rectangles because it is a transactional printer in a Variable Data Print (VDP) mode.

The lower part 22 displays the first merged schedule of print jobs and operational actions according to the invention. The print jobs are visible in a print queue per printer A, B, C, D. Each print queue is horizontally positioned in line with a time line indicated by time ticks 34. The operational actions are positioned in the print queues.

An operational action is indicated for printer C by a red vertical bar 25 at time moment zero ('0). Printer C is out of order and need to be restarted to produce the print job named "Report.pdf". The fact that printer C is out of order may also be indicated by a red bar 24 in front of the printer image of printer C on the left side of lower part 22. Another operational action is indicated for printer A. Below the print queue A a small green rectangle 28 may indicate that the receiving material is sufficient for a print job named "Appendix Report.pdf" and partly sufficient for a subsequent print job named "Report.pdf". It is foreseen by the first merged schedule that during the printing of the subsequent print job named "Report.pdf" the receiving material will become exhausted. This moment in time is indicate by a small orange rectangle 30 underneath the print job in the print queue for printer A. The fact that the receiving material of printer A becomes exhausted may also be indicated by an orange bar 23 in front of the printer image of printer A on the left side of lower part 22.

According to the invention a second merging schedule module residing on the data gathering control unit merges the operational actions for the printers A, B, C, D chronologically into a second merged schedule. The data gathering control unit sends signals representing the second merged schedule to the user interface screen. The second merged schedule is displayed on window 20 in the upper part 21. Besides the time ticks 34 the upper part also comprises icons 31, 32 to indicate the foreseen operational actions on the printers A, B, C, D to be executed by the operator. A first icon 31 indicates the moment in time for an operational action corresponding to printer C and corresponding to the red vertical bar 25 at time moment '0 (now). A vertical orange bar 33 indicates the moment in time for an operational action corresponding to printer A and corresponding to the orange rectangle 30 concerning a replenishment of receiving material for printer A at time moment '5 (5 minutes from now). Attached to the vertical orange bar 33 is a second icon 32 to indicate the kind of operational action. According to an embodiment a vertical line is provided to connect the icons 31, 32 with the print job queues of the corresponding printers C, A respectively.

The operator only has to look at the upper part 21 in order to keep the plurality of printers running. The first icon 31 differs from the second icon 32 in order to indicate which operational action is required. The first icon 31 shows a red cross indicating a total stop and a needed restart of the printer C. The second icon 32 shows a couple of sheets indicating a needed replenishment of receiving material for the printer A.

According to an embodiment additional information about an operational action corresponding to the icon 31, 32 may be displayed in a pop-up window near the icon.

The additional information may be displayed when selecting the icon by a mouse click or a touch of a finger in case of a touch screen. The additional information may be a name of the respective printer, alert or error description of the operational action, an advice for a solution of the error. The additional information may be stored in the gathering control unit or may be received upon request from the respective printer via the network N.

According to an embodiment an order of the first merged schedules for the plurality of printers on the user interface screen corresponds to a chronological order of first moments in time of the planned operational actions for the respective printers. The control unit is configured to display the first merged schedules on the user interface screen in an order which corresponds to a chronological order of the operational actions, each of which is first in time planned for the printer corresponding to the respective first merged schedule. By doing so, the printer which has to be operationally acted upon first in time of all printers of the plurality of printers, is at the head of the displayed first merged schedules and attracts the attention of the operator.

Other operational actions may be envisioned. Some operational actions will require operator intervention. Examples of such operational actions are replenishment of marking material like inks, fluids, toner, plastic, metal etc, exchange of a consumable like a fuser belt, a master band, an ink cartridge, a print head, or a scan unit, a paper jam recovery procedure, unloading of an output holder, and emptying a waste container for staples, perforation waste, ink, toner etc. Some operational actions will require no operator intervention, but will require some time that a print job cannot be produced. An example of such operational action may be printing of a calibration sheet.

Figure 3:
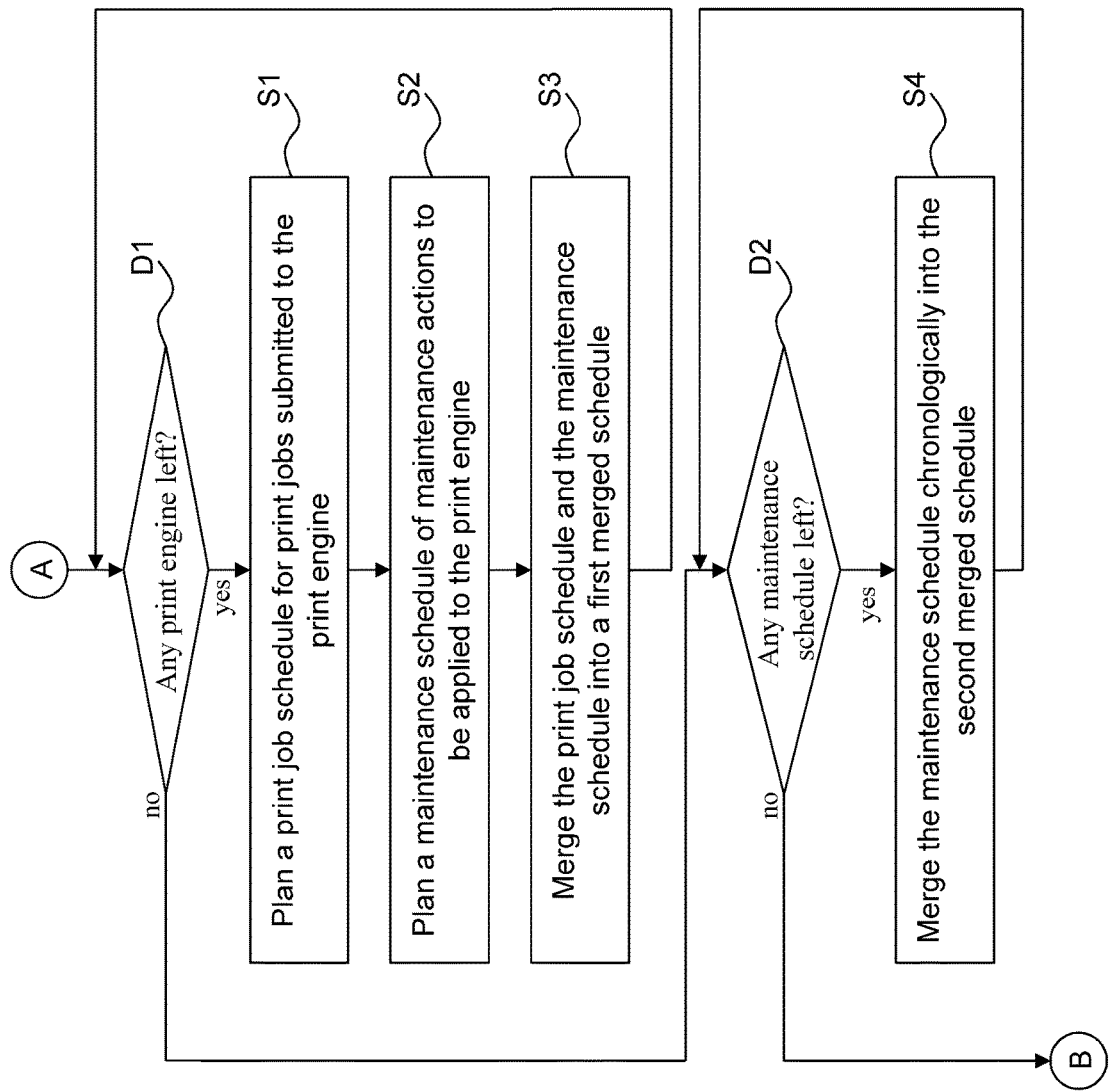
FIGS. 3-4 show a flow diagram of the method according to the invention.
Figure 4:
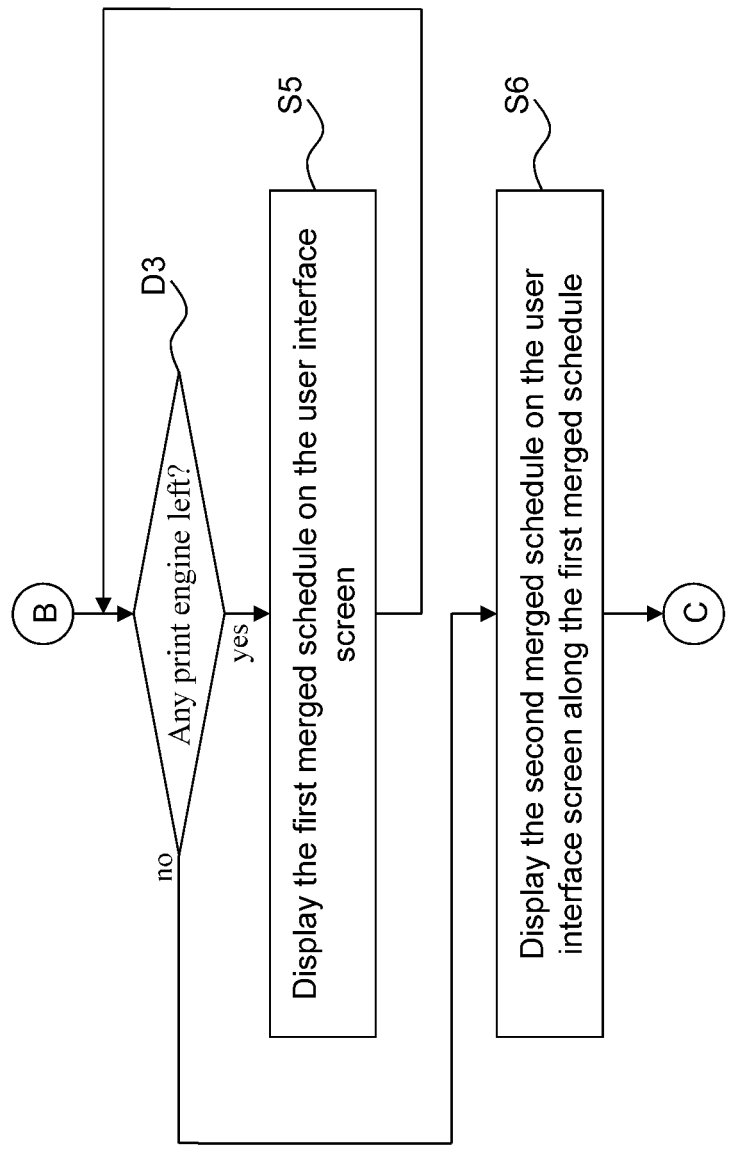

FIG. 3 and FIG. 4 show a flow diagram of the method according to the invention.

The method is used for a print system comprising a plurality of printers and a user interface screen according to the invention.

A starting point A in FIG. 3 leads to a first step S1.

The first step S1, a second step S2 and a third step S3 are executed for each printer of the plurality of printers in the print system according to the invention in a first loop over the plurality of printers. The first loop starts in a first decision step D1 which checks if there is a printer which has not been dealt with. If there is a printer not dealt with according to the method, the method proceeds with the first step S1 for that printer, the second step S2 for that printer and the third step S3 for that printer. If all printers are dealt with the method proceeds with a fourth step S4.

According to the first step S1 a print job schedule is planned for print jobs submitted to the printer. A duration time for each print job is calculated and the print jobs may be scheduled to the first-in first-out principle or any other principle in order to form a print queue.

According to the second step S2 an operational action schedule of operational actions is planned to be applied to the printer. Each printer may need regular operational actions like cleaning, wiping, purging, or may need a replenishment of supplies due to usage of the supplies by the print jobs. For example an amount of paper sheets present in the printer when a print job starts may be known to the control unit of the printer. The amount of paper needed for the print job may be known from the print job specifications known to the control unit of the printer. In this way replenishment of paper may be scheduled in a replenishment action for the printer. The operational action schedule is based on the information of the print job schedule planned in the first step S1 and on information derived from sensors in the respective printer.

According to a third step S3 the print job schedule and the operational action schedule are merged into a first merged schedule. The first merged schedule comprises the print jobs and the operational actions in chronological order.

A fourth step S4 is executed for each planned operational action schedule in a second loop over the plurality of planned operational action schedules. The second loop starts in a second decision step D2 which checks if there is a planned operational action schedule which has not been dealt with. If there is a planned operational action schedule not dealt with according to the method, the method proceeds with the fourth step S4. If all planned operational action schedules are dealt with the method proceeds to in-between point B.

According to the fourth step S4 the planned operational action schedules are merged chronologically into the second merged schedule. The second merged schedule comprises the scheduled operational actions for all printers in the print system according to the invention.

The method proceeds in in-between point B in FIG. 4. The in-between point B in FIG. 4 leads to a fifth step S5.

The fifth step S5 is executed for each printer of the plurality of printers in the print system according to the invention in a third loop over the plurality of printers. The third loop starts in a third decision step D3 which checks if there is a printer which has not been dealt with. If there is a printer not dealt with according to the method, the method proceeds with the fifth step S5 for that printer. If all printers are dealt with the method proceeds with a sixth step S6.

According to the fifth step S5 the first merged schedule is displayed on the user interface screen. An example of the displayed first merged schedule for each printer is shown in the lower part 22 of the window 20 in FIG. 3 for printers A, B, C, D respectively. The user interface screen receives signals representing the first merged schedule from the connected gathering control unit which plans the first merged schedule and the second merged schedule.

According to the sixth step S6 the second merged schedule is displayed on the user interface screen along the displayed first merged schedule. An example of the displayed second merged schedule is shown in the upper part 21 of the window 20 in FIG. 3. The user interface screen receives signals representing the second merged schedule from the connected gathering control unit which plans the first merged schedule and the second merged schedule.

The method ends in an end point C.

According to a further embodiment of the method the sixth step S6 displays only the operational actions of the second merged schedule which need operator intervention.

The skilled person will recognise that other embodiments are possible within the scope of the appended claims.

The invention claimed is:

1. A print system comprising:
   a plurality of printers for printing print jobs, each printer of the plurality of printers comprising a print job scheduler for planning a print job schedule for print jobs submitted to the printer and an operational action scheduler for planning an operational action schedule of operational actions to be applied to the printer, each operational action requires operator intervention before or during a respective print job and being an operation action out of loading consumables, loading receiving material, loading finishing material, unloading an output holder and emptying a waste container for staples, perforation waste, ink and toner;
   a user interface screen; and
   a controller configured for:
   a first merge of the print job schedule for each printer and the operational action schedule into a first merged schedule, the controller is configured to control for each printer a display of the first merged schedule on the user interface screen in a predetermined time frame; and
   a second merge of the operational action schedules of the plurality of printers chronologically into a second merged schedule,
   wherein the controller is configured to control a display of the second merged schedule along the first merged schedule on the user interface screen in one time line and in the predetermined time frame,
   wherein the second merged schedule includes at least one indication item for each of the operational actions according to the operational action schedules of the plurality of printers at planned moments in time,
   wherein the at least one indication item is distinguishable for each type of operational action and is located at the time the respective operational action is to occur,
   wherein the predetermined time frame is indicated in an upper part of the user interface in the form of a plurality of time ticks, and
   wherein the at least one indication item for each operational action includes two separate indication items representing the same operational action, a first indication item of the two separate indication items being located in the upper part of the user interface between two neighboring time ticks of the plurality of time ticks and adjacent to a time tick of the two neighboring time ticks that is corresponding to the time the respective operational action is to occur and a second indication item of the two separate indication items being located in the first merged schedule of the printer associated with the respective operational action.

2. The print system according to claim 1, wherein the controller is configured to control the display on the user interface screen of the first merged schedule and the second merged schedule along a same time axis.

3. The print system according to claim 1, wherein the controller is configured to display additional information near or at an operational action on the displayed second merged schedule upon selection of the operational action.

4. The print system according to claim 2, wherein the controller is configured upon selection of a printer from the first merged schedule displayed on the user interface screen to replace the displayed first merged schedule by information regarding the selected printer.

5. The print system according to claim 1, wherein the controller is configured to provide a vertical line on the user interface screen in order to connect an indication item with the first merged schedule of the corresponding printer.

6. The print system according to claim 1, wherein the controller is configured to display the first merged schedule on the user interface screen in an order which corresponds to a chronological order of the operational actions, each operational action is first in time planned for the respective printer.

7. The print system according to claim 2, wherein the controller is configured to display the first merged schedule on the user interface screen in an order which corresponds to a chronological order of the operational actions, each operational action is first in time planned for the respective printer.

8. The print system according to claim 3, wherein the controller is configured to display the first merged schedule on the user interface screen in an order which corresponds to a chronological order of the operational actions, each operational action is first in time planned for the respective printer.

9. The print system according to claim 4, wherein the controller is configured to display the first merged schedule on the user interface screen in an order which corresponds to a chronological order of the operational actions, each operational action is first in time planned for the respective printer.

10. The print system according to claim 1, wherein the second merged schedule is provided without representations of the print job.

11. The printing system according to claim 1, wherein the two separate indication items lie on a vertical line in the user interface starting from the first indication item and ending at the second indication item.

12. The printing system according to claim 11, wherein the vertical line from the first indication item to the second indication item is visible on the user interface.

13. A method of using a print system comprising a plurality of printers for printing print jobs and a user interface screen, the method comprising the steps of:
    planning for each printer of the plurality of printers a print job schedule for print jobs submitted to the printer;
    planning for each printer of the plurality of printers an operational action schedule of operational actions to be applied to the printer, each operational action requires operator intervention before or during a respective print job and being an operation action out of loading consumables, loading receiving material, loading finishing material, unloading an output holder and emptying a waste container for staples, perforation waste, ink and toner;
    merging for each printer the print job schedule and the operational action schedule into a first merged schedule;
    displaying for each printer the first merged schedule on the user interface screen in a predetermined time frame;
    merging the operational action schedules of the plurality of printers chronologically into a second merged schedule; and
    displaying the second merged schedule along the first merged schedule on the user interface screen in one time line and in the predetermined time frame,
    wherein the second merged schedule includes at least one indication item for each operational action according to the operational action schedules of the plurality of printers at planned moments in time,
    wherein the at least one indication item is distinguishable for each type of operational action and is located at the time the respective operational action is to occur,
    wherein the predetermined time frame is indicated in an upper part of the user interface in the form of a plurality of time ticks, and
    wherein the at least one indication item for each operational action includes two separate indication items representing the same operational action, a first indication item of the two separate indication items being located in the upper part of the user interface between two neighboring time ticks of the plurality of time ticks and adjacent to a time tick of the two neighboring time ticks that is corresponding to the time the respective operational action is to occur and a second indication item of the two separate indication items being located in the first merged schedule of the printer associated with the respective operational action.

14. The method according to claim 13, further comprising the step of displaying the first merged schedule and the second merged schedule along a same time axis on the user interface screen.

15. The method according to claim 13, further comprising the step of, upon selection of an operational action on the displayed second merged schedule on the user interface screen, displaying additional information about the operational action near or at the selected operational action.

16. The method according to claim 13, further comprising the step of, upon selection of a printer from the first merged schedule displayed on the user interface screen, replacing the displayed first merged schedule by information regarding the selected printer.

17. A non-transitory computer readable medium comprising computer executable program code configured to instruct at least one computer to perform the method according to claim 13.

18. The method according to claim 13, wherein the second merged schedule is provided without representations of the print job.

19. The method according to claim 13, wherein the two separate indication items are on a vertical line in the user interface starting from the first indication item and ending at the second indication item.

* * * * *